US012278068B2

(12) United States Patent
Gaudinat

(10) Patent No.: US 12,278,068 B2
(45) Date of Patent: Apr. 15, 2025

(54) PYROTECHNIC CIRCUIT BREAKER

(71) Applicant: Autoliv Development AB, Vargarda (SE)

(72) Inventor: Francois Gaudinat, Amblainville (FR)

(73) Assignee: Autoliv Development AB, Vargarda (SE)

( * ) Notice: Subject to any disclaimer, the term of this patent is extended or adjusted under 35 U.S.C. 154(b) by 108 days.

(21) Appl. No.: 18/006,102

(22) PCT Filed: Jul. 12, 2021

(86) PCT No.: PCT/EP2021/069262

§ 371 (c)(1),
(2) Date: Jan. 19, 2023

(87) PCT Pub. No.: WO2022/017841

PCT Pub. Date: Jan. 27, 2022

(65) Prior Publication Data

US 2023/0290596 A1 Sep. 14, 2023

(30) Foreign Application Priority Data

Jul. 24, 2020 (FR) ....................................... 2007814

(51) Int. Cl.
*H01H 39/00* (2006.01)

(52) U.S. Cl.
CPC .......... *H01H 39/006* (2013.01); *H01H 39/00* (2013.01)

(58) Field of Classification Search
CPC . H01H 39/00; H01H 39/006; H01H 2039/008
See application file for complete search history.

(56) References Cited

U.S. PATENT DOCUMENTS

| | | | | |
|---|---|---|---|---|
| 2013/0175144 A1 | 7/2013 | Sprenger et al. | | |
| 2013/0220095 A1* | 8/2013 | Ukon | H01H 39/006 83/639.1 | |
| 2016/0343524 A1* | 11/2016 | Gaudinat | B60L 3/04 | |
| 2017/0229268 A1* | 8/2017 | Goldman | H01H 9/342 | |
| 2019/0292366 A1* | 9/2019 | Bienmueller | C08L 77/02 | |
| 2020/0211801 A1* | 7/2020 | Lell | H01H 9/02 | |
| 2022/0246377 A1* | 8/2022 | Gerlaud | H01H 9/106 | |

FOREIGN PATENT DOCUMENTS

| | | |
|---|---|---|
| FR | 3088592 A1 | 5/2020 |
| WO | 2019154463 A1 | 8/2019 |
| WO | 2020099486 A1 | 5/2020 |

* cited by examiner

*Primary Examiner* — Jacob R Crum
(74) *Attorney, Agent, or Firm* — Harness, Dickey & Pierce, P.L.C.; Stephen T. Olson

(57) ABSTRACT

A pyrotechnic circuit breaker comprising a housing, at least two connection terminals, an internal electrical circuit connecting the two connection terminals and formed for example by an electrical conductor, an opening member, movable and arranged to open a part to be opened of the internal electrical circuit when moving between an initial position and a final position, so as to form at least two separate portions of conductor after opening, a pyrotechnic actuator arranged to move the opening member from the initial position to the final position, an internal chamber receiving the part to be opened, wherein the internal chamber comprises or contains at least one internal surface formed by a wall formed with a plastic material comprising a flame retardant.

19 Claims, 5 Drawing Sheets

PYROTECHNIC CIRCUIT BREAKER

TECHNICAL FIELD OF THE INVENTION

The present invention relates in general to a pyrotechnic circuit breaker intended to be mounted on a motor vehicle, and in particular in an electrical power circuit of a motor vehicle, for example a hybrid vehicle or an electric vehicle.

STATE OF THE ART

Circuit breaker devices, such as the one described in document US20130175144, which proposes to use a flowable insulating material are known in the prior art. On the other hand, this system notably has the drawback of requiring a lot of flowable insulating material, which requires large quantities, can generate leaks. In the case of a material containing silicone, precautions and authorizations will be necessary for automotive use (due to not being compatible with the paint for example). Furthermore, the applicant has noticed that such a flowable insulating material can generate longer opening times and/or degraded performance during the operation of the circuit breaker (the time taken to effectively cut off the passage of a high-power current (for example at least 100 A/100 V, or for example 800 A/450 V). Finally, it is important to be able to guarantee good insulation resistance after operation.

Document WO2020099486A1 discloses a pyrotechnic circuit breaker with an inner wall made of plastic material that can contain reinforcing fibers, such as glass fibers. With such an apparatus, the applicant has found that the insulation resistances after operation may not be sufficient to meet particular or severe demands.

DISCLOSURE OF THE INVENTION

One aim of the present invention is to address the disadvantages of the prior art mentioned above and in particular, first of all, to propose a pyrotechnic circuit breaker that is simple to manufacture, having high cutting capacities, a rapid opening time during operation, and good insulation resistance after opening.

A first aspect of the invention therefore relates to a pyrotechnic circuit breaker comprising:

- a housing,
- at least two connection terminals,
- an internal electrical circuit connecting the two connection terminals and formed for example by an electrical conductor,
- an opening member which is movable and arranged to open a part to be opened of the internal electrical circuit when moving between an initial position and a final position, so as to form at least two separate portions of conductor after opening,
- a pyrotechnic actuator arranged to move the opening member from the initial position to the final position,
- an internal chamber receiving the part to be opened, characterized in that the internal chamber comprises or contains at least one internal surface formed by a wall formed with a plastic material comprising a flame retardant.

According to the implementation hereinbefore, the circuit breaker comprises a wall arranged in the internal chamber, that is, facing the part to be cut, and which contains a flame retardant. The applicant has found that the insulation resistances after operation were higher than those measured on circuit breakers having the same geometric configuration, but no material with a flame retardant. In other words, providing a flame retardant in the material of one of the walls exposed to the electric arc formed during the breaking makes it possible to significantly reduce the leakage currents once the breaking has been performed.

In other words, the internal chamber comprises or contains at least one internal surface formed by a wall formed:

- with a plastic material containing a flame retardant additive, or
- with a plastic material comprising an additive selected to be a flame retardant.

According to this implementation, provision may be made for the flame-retardant additive to be directly integrated or incorporated into the granules which will be melted in order to be used, for example, to inject the surface of the wall in the internal chamber.

According to one embodiment, said plastic material comprising the flame retardant may be a polymer, such as a polyamide, and preferably a polyphthalamide (PA 6T/66).

According to one embodiment, said plastic material comprising the flame retardant can be a polymer forming a matrix, and comprising a filler material, such as fibers, preferably inorganic fibers, for example glass fibers, in a proportion ranging from 10% to 70% by weight and preferably in a proportion ranging from 45% to 55% by weight.

According to one embodiment, said plastic material comprising the flame retardant can self-extinguish after 10 seconds, during a flammability test according to standard UL94 (6th edition of 28 Mar. 2013) performed on a vertical test specimen, particle losses being permitted as long as the particles lost are not ignited.

According to one embodiment, the flame retardant may be a non-halogenated compound, selected from:

- the conversion or reaction products of melamine with cyanuric acid,
- the melamine condensation products,
- the conversion or reaction products of melamine with polyphosphoric acid,
- the conversion or reaction products of the products of the condensation of melamine with polyphosphoric acid,
- metal phosphinates,
- esters of phosphoric acid,
- mixtures of these materials.

According to one embodiment, the flame retardant may be a non-halogenated compound, selected from the following compounds and the mixtures thereof:

- melamine cyanurate, melamine phosphate, melamine pyrophosphate, melamine polyphosphate, melem phosphate (that is, 2,5,8-triaminoheptazine phosphate), melem pyrophosphate, dimelamine pyrophosphate, dimelamine phosphate, melem polyphosphate, phosphaphenanthrenes, metal hydroxides, phosphinic acid salts, diphosphinic acid salts.

It may be noted that glass fibers used in a known manner to reinforce a plastic material, even if they do not burn or do not burn easily, do not in any way limit or delay an ignition or combustion of said plastic material.

According to one embodiment, the pyrotechnic circuit breaker can comprise a base part formed by a second plastic material, and said plastic material comprising the flame retardant may be attached to or over-molded on the base part. Such an implementation makes it possible to position the plastic material comprising the flame retardant only where it will be correctly exposed to the electric arc, without providing an additional part.

According to one embodiment, the opening member may comprise:

an opening body formed by a second plastic material, an exposed face, formed by the second plastic material comprising the flame retardant over-molded on or attached to the opening body and arranged opposite the part to be opened and/or on the same side as the internal chamber. Such a positioning on the opening member guarantees that the plastic material comprising the flame retardant will be as close as possible to the electric arc, and will therefore be well exposed to the latter in order to then guarantee that the insulation resistances are high and reproducible.

According to one embodiment, said second material may be a polyamide, preferably a polyphthalamide (PA 6T/XT) forming a matrix, and able to comprise glass fibers, in a proportion ranging from 40% to 50% by weight. The second material makes it possible to provide a robust opening body that can withstand mechanical forces.

According to one embodiment, the pyrotechnic circuit breaker can be arranged to produce an electric arc between the two discrete portions of conductor during the movement of the opening member between the initial position and a final position, when the circuit breaker is connected to a live electrical circuit, and the plastic material comprising the flame retardant can be arranged in order to be removed by ablation by the electric arc. In detail, the plastic material comprising the flame retardant arranged to be removed by ablation is transformed (for example, sublimed) under the action of the intense heat flux of the electric arc. This material removed by ablation can then condense or deposit on the walls of the internal chamber, and this provides high insulation resistances. Furthermore, such an implementation can modify the composition of the electric arc plasma and its conductivity, and makes it possible to increase the electric arc voltage. Such electric arcs can be created when the circuit breaker is connected to a live electrical circuit, with voltages ranging from 0 V to 1000 V and currents ranging from 0 A to 25000 A on inductive loads ranging up to 2500 μH (micro-Henry) for an intensity of less than 500 A and up to 5 μH for an intensity of 25000 A. The circuit breaker according to the invention makes it possible to reliably break the current in less than 10 ms and even less than 5 ms, in a permanent manner, because the circuit breaker, comprising a pyrotechnic actuator, can only be used once. Once used, the circuit breaker also has good insulation resistance.

According to one embodiment, the pyrotechnic circuit breaker may comprise at least one passage arranged to guide the electric arc between the two different portions of conductor, and the plastic material comprising the flame retardant may be arranged to form or delimit at least partially the passage. According to this implementation, the plastic material comprising the flame retardant is necessarily exposed to the electric arc.

According to one embodiment, the passage may be at least partially formed on the opening member.

According to one embodiment, the internal chamber can comprise or contain at least one wall formed with a third plastic material comprising silicone. According to this implementation, at least one other wall of the internal chamber comprises silicone. The applicant has found that adding silicone to a material forming the wall makes it possible to guarantee high insulation resistances after use. Furthermore, the applicant has found that if another wall comprises the flame retardant, then the effect on the insulation resistances is amplified.

According to one embodiment, the pyrotechnic circuit breaker may comprise at least one support, and the third plastic material comprising silicone may be over-molded on or attached to the support. Such an implementation makes it possible to position the third plastic material comprising the silicone only where it will have a notable effect on the insulation resistance, without providing an additional part.

According to one embodiment, the support may comprise a portion of the electrical conductor.

According to one embodiment, the support may comprise a housing portion.

According to one embodiment, the support may comprise a portion of the opening member.

According to one embodiment, the wall formed with the third plastic material comprising silicone can support a leakage current route between the two discrete portions of conductor after opening, and preferably the shortest leakage current route between the two discrete portions of conductor after opening. Such an implementation, with the addition of silicone in the wall supporting the shortest leakage current route, makes it possible to effectively break the leakage current route which would be taken by a leakage current.

According to one embodiment, the wall formed with the third plastic material comprising silicone may cover less than 50% of a total surface area of the internal chamber. Such an implementation makes it possible to limit the use or the addition of silicone only where it will have a notable effect on the insulation resistances.

According to one embodiment, the third plastic material comprising silicone may comprise a polyamide-type polymer, preferably a polyphthalamide of type PA 6T/XT.

According to one embodiment, the third plastic material comprising silicone can comprise silicone and/or polysiloxane, in a proportion ranging from 3.5% to 6.5% by weight, and preferentially from 4.25% to 5.75% by weight.

According to one embodiment, once the opening member is in the final position, an insulation resistance between the connection terminals may be greater than 30 Mohms, preferably greater than 50 Mohms, preferably greater than 100 Mohms, preferably greater than 500 Mohms, and very preferentially greater than 1 Gohms.

Another aspect of the invention relates to a method for manufacturing a circuit breaker according to the first aspect, comprising the steps of:

forming a housing, forming an internal electrical circuit connecting the two connection terminals and formed for example by an electrical conductor, providing an opening member movable and arranged to open a part to be opened of the internal electrical circuit when moving between an initial position and a final position, so as to form at least two discrete portions of conductor after opening, providing a pyrotechnic actuator arranged to move the opening member from the initial position to the final position, forming an internal chamber receiving the part to be opened, characterized in that the method comprises a step consisting in forming the internal chamber with at least one wall formed with a plastic material comprising silicone, by adding to a first raw material, for example granulated, intended to form the internal chamber, a second raw material, for example granulated, comprising between 40% and 60% by weight of silicone.

In other words, the method according to the invention comprises a step consisting in mixing, before the manufacture of the internal chamber, the first raw material, for example granulated, intended to form the internal chamber, with the second raw material, for example granulated, comprising between 40% and 60% by weight of silicone. Typically, the wall comprising the silicone is formed by an injection-molding method, and the manufacturing method comprises a step of preparing the material to be injected by mixing two types of granules; the first raw material and the second raw material which contains the silicone. There is therefore no pure silicone to be provided or handled, simply solid granules already comprising the silicone. This implementation makes it possible to maintain a simple method.

Another aspect of the invention relates to a motor vehicle comprising at least one circuit breaker according to the first aspect.

DESCRIPTION OF THE FIGURES

Other characteristics and advantages of the present invention will become more apparent upon reading the detailed description of an embodiment of the invention, which is provided by way of example but in no manner limited thereto, and illustrated by the attached drawings, in which.

DETAILED DESCRIPTION OF EMBODIMENT(S)

Figure 1:
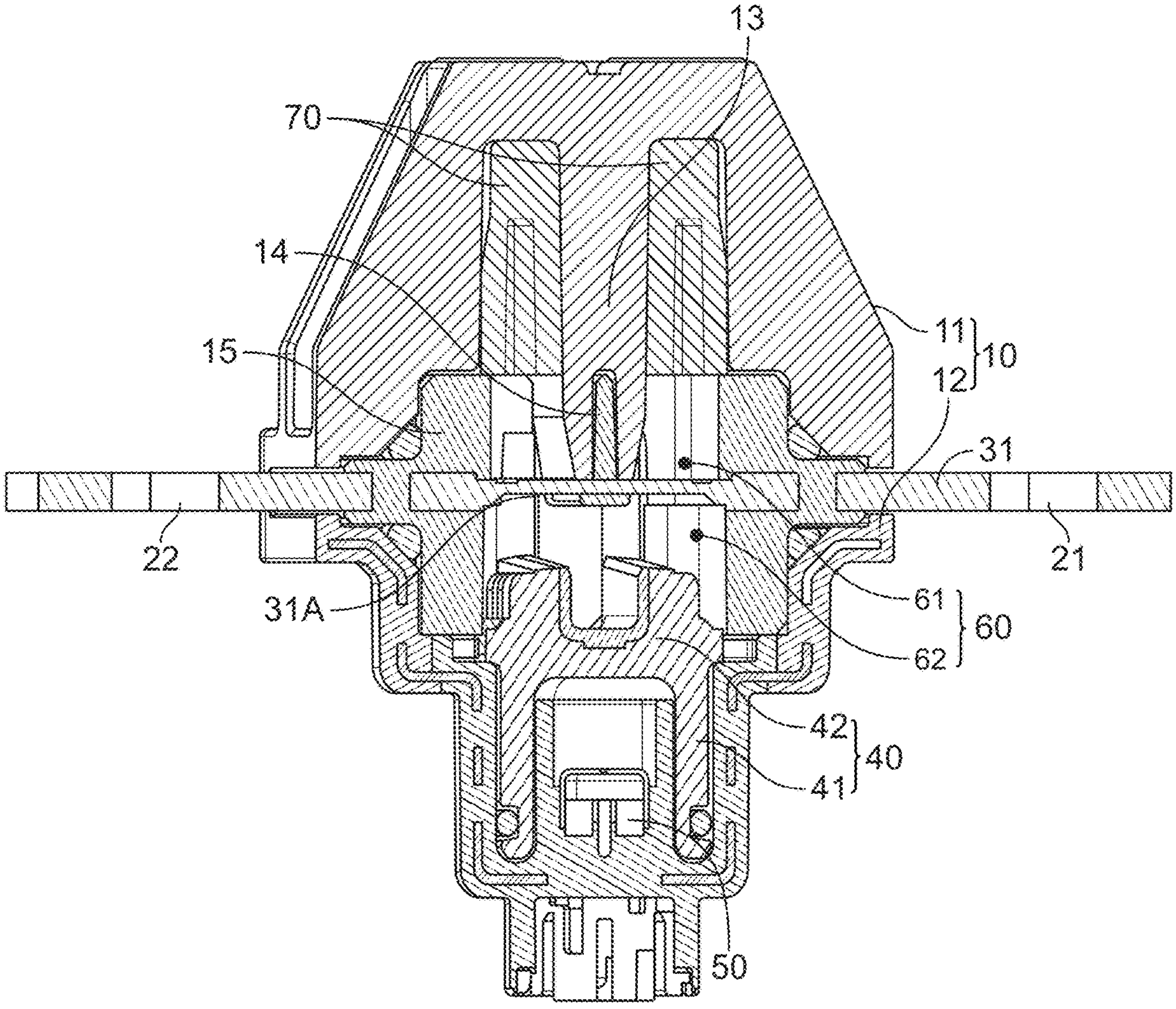
FIG. 1 shows a cross-sectional view of a pyrotechnic circuit breaker, comprising in particular a housing traversed by an electrical conductor forming an internal electrical circuit, a pyrotechnic actuator, and an opening member arranged to open the internal electrical circuit when the pyrotechnic actuator is actuated or triggered.

FIG. 1 shows a circuit breaker especially comprising:

- a housing 10 formed by a lower housing portion 12 and an upper housing portion 11,
- two connection terminals 21 and 22,
- an internal electrical circuit connecting the two connection terminals 21 and 22 and formed by an electrical conductor 31,
- an opening member 40, movable and arranged to open a part to be opened 31A of the internal electrical circuit when moving between an initial position (according to FIG. 1) and a final position (according to FIG. 4), so as to form at least two discrete portions of conductor 32 and 33 (visible in FIG. 4) after opening,
- a pyrotechnic actuator 50 arranged to move the opening member 40 from the initial position to the final position,
- an internal chamber 60 (comprising a lower chamber 62 and an upper chamber 61), defined by one or more inner walls formed in the housing 10, and receiving the part to be opened 31A,
- coolers 70 arranged inside the housing 10 and defined to lower the temperatures of the gases during operation and thus increase the breaking capacity of the circuit breaker.

The circuit breaker of FIG. 1 is typically integrated into a power circuit of a motor vehicle (an electric vehicle, for example) and can be used to break the power circuit if an emergency occurs. One of the functions of this circuit breaker is therefore to be able to break a power circuit quickly, even if high currents are present (more than 500 amperes for example). Another function of this circuit breaker is to guarantee good insulation resistance between the connection terminals 21 and 22 after the internal electrical circuit is opened.

Figure 4:
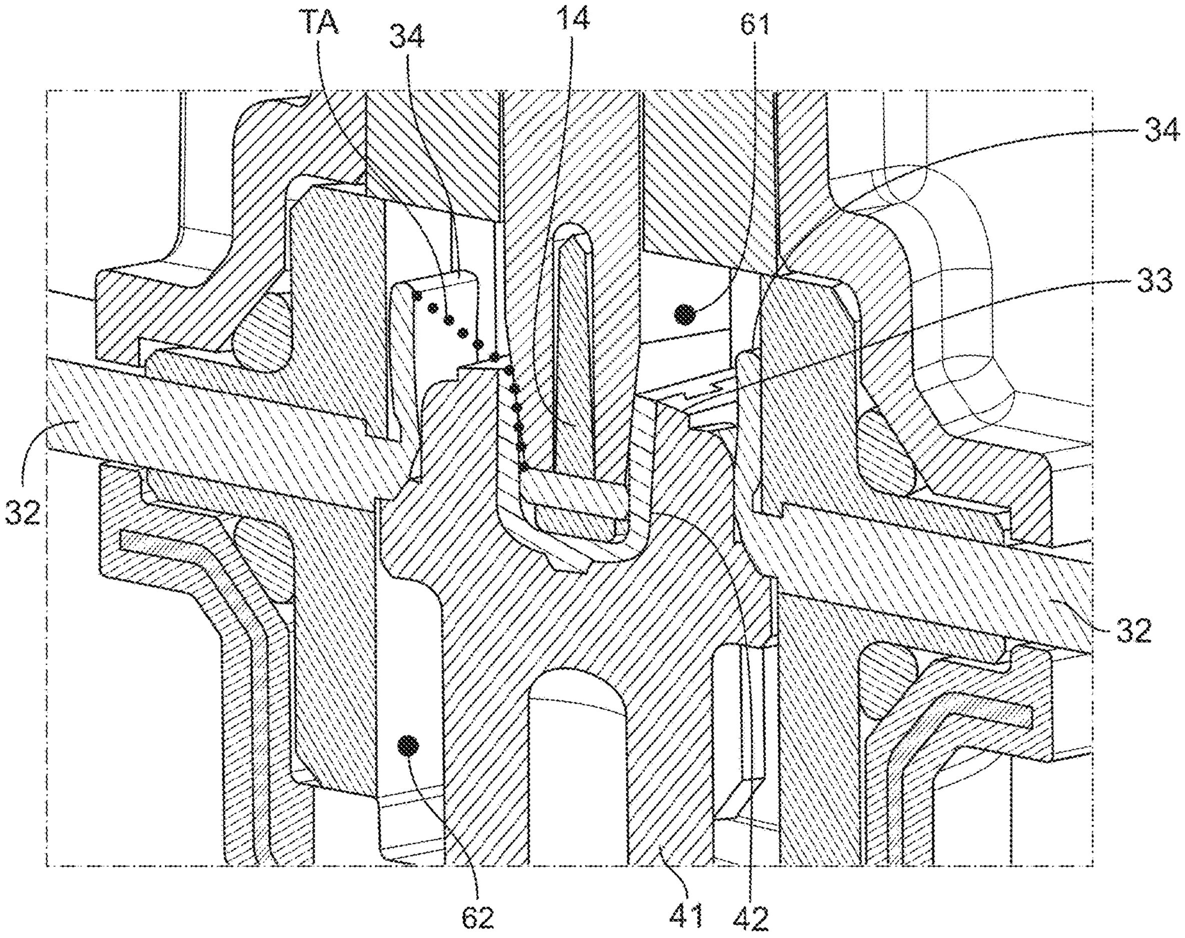
FIG. 4 shows a detail of a cross-section of the circuit breaker of FIG. 1 after the pyrotechnic actuator is actuated or triggered.

In order to address the opening function, the pyrotechnic actuator 50 (typically an electro-pyrotechnic igniter) is triggered and a high pressure is generated in the space between the pyrotechnic actuator 50 and the opening member 40, which pushes the latter towards the top of FIG. 1, to move from the initial position shown to the final position of FIG. 4.

During this movement, the opening member 40 comes into contact with the part to be opened 31A of the electrical conductor, and therefore opens the internal electrical circuit by cutting the electrical conductor 31, by a mechanical shearing. However, an opening may be alternatively provided by pushing one of two strands that are initially discrete and in contact with one another, in order to separate them.

Figure 3:
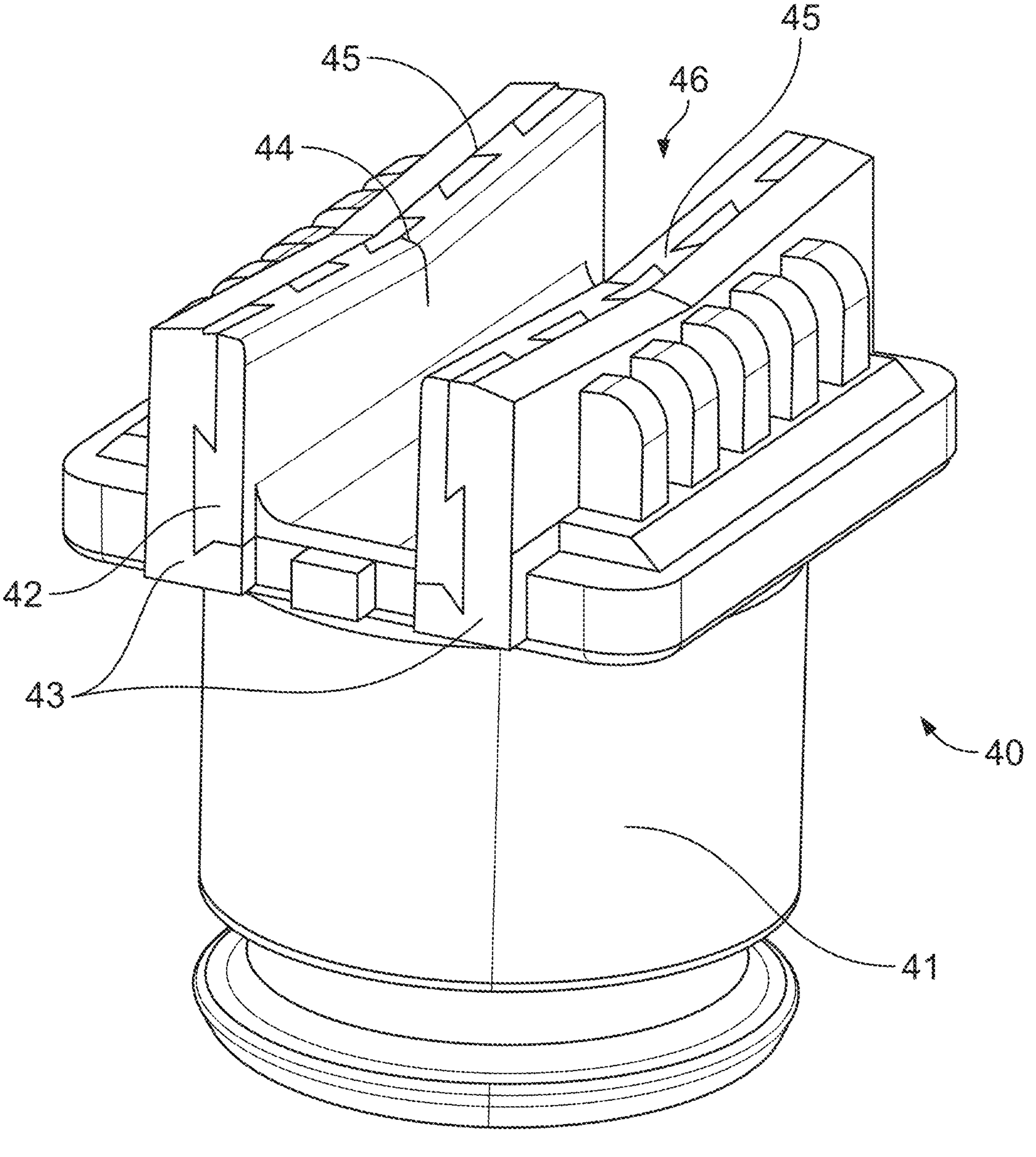
FIG. 3 shows a detail of the opening member of the circuit breaker of FIG. 1.

As shown in FIG. 3, the opening member 40 comprises two projections 45, separated by a groove 46, and which form knives to cut the part to be opened 31A. In detail, and as shown in FIG. 1, the part to be opened 31A comprises a central portion supported by a return 13 of the upper housing portion 11, engaged with a bar 14 overmolded on the central portion of the part to be opened 31A and integral with an overmolded body 15, overmolded on the electrical conductor 31.

When the opening member 40 moves from the initial position to the final position, the projections 45 of the opening member 40 bear on the non-supported parts of the electrical conductor 31 and shear it on either side of the bar 14 and the return 13 (at the part to be opened 31A opposite the upper chamber 61). However, having a single projection 45 or more than two projections 45 may be alternatively provided, the number of projections 45 defining the number of breaks made on the electrical conductor 31 during the movement of the opening member 40.

As shown in FIG. 4, the shearing of the electrical conductor 31 forms:

- two discrete lateral portions 32 each having an inner end 34 in the internal chamber 60 (and in particular in the upper chamber 61), and
- a central portion 33, which remained engaged with the bar 14.

Furthermore, at the very beginning of opening, when the inner ends 34 are still in the vicinity of the central portion 33, an electric arc can form (depending on whether current passes through the electrical conductor 31 or not) between each inner end 34 and the central portion 33, at an arc path TA shown in dotted lines in FIG. 4. During the movement from the initial position to the final position, the opening member 40 pushes and causes each discrete lateral portion 32 to bend, so that the arc path TA "stretches" or "elongates" in order to present at the end of operation a sufficient free distance to guarantee an electric arc extinguishing and rapid breaking or opening of the internal electrical circuit.

Figure 2:
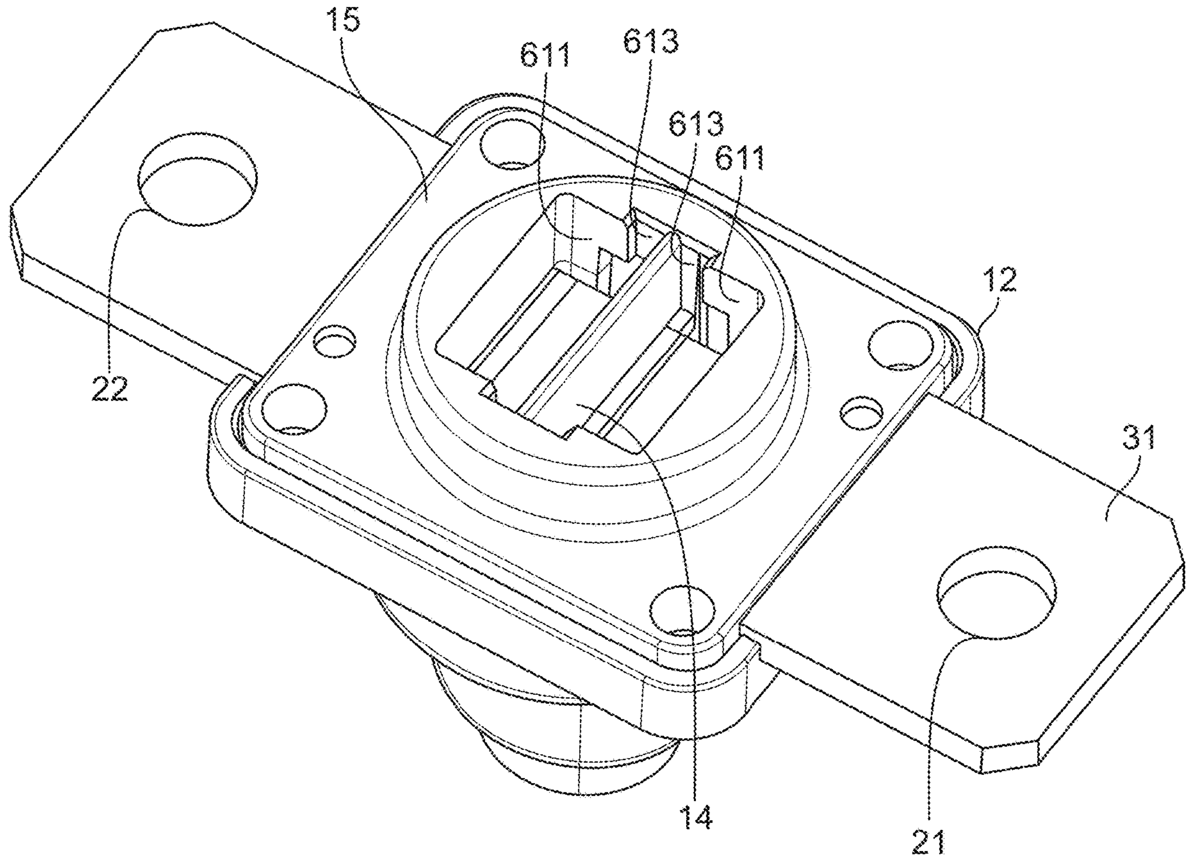
FIG. 2 shows a detail of the housing of the circuit breaker of FIG. 1.

FIGS. 2 and 3 show the mounting of the opening member 40 in the housing 10, and in particular, guide units are provided between the opening member 40 and the housing 10, at the overmolded body 15. Indeed, the opening member 40 (FIG. 3) is provided with lateral projections 43 forming guide protrusions, and the over-molded body 15 with lateral grooves 613 forming guide grooves, formed in lateral walls 611 of the upper chamber 61 (visible in FIG. 2).

The opening member 40 is therefore mounted in a sliding or translational connection relative to the housing 10 and slides during its movement from the initial position to the final position, which provides a reproducible, controlled final operation and position in order to guarantee rapid opening and arc extinguishing at the end of operation with a sufficient free distance.

However, the operation of the pyrotechnic actuator 50 may generate numerous hot particles and gases which are projected into the internal chamber 60, and which typically cover or condense on the walls of the latter, and in particular the walls 611, the lateral projections 43 and the lateral grooves 613. Such deposits can form an electrically conductive or slightly electrically conductive layer, and an insulation resistance, after opening of the electrical conductor 31, may be affected.

Furthermore, the electric arc can remove by ablation the material of the opening member 40 and/or of the housing 10 (return 13 or bar 14 especially), which can generate gases or particles which will also cover and/or condense on the walls of the internal chamber 60 and also affect the insulation resistance.

Such an insulation resistance, measured after operation, between the connection terminals 21 and 22 must be high, to guarantee an absence of leakage current between the connection terminals 21 and 22 after opening the internal electrical circuit of the circuit breaker.

Such leakage currents typically pass through leakage current paths between the discrete portions of conductor after opening, which extend along the inner wall of the internal chamber 60.

Figure 5:
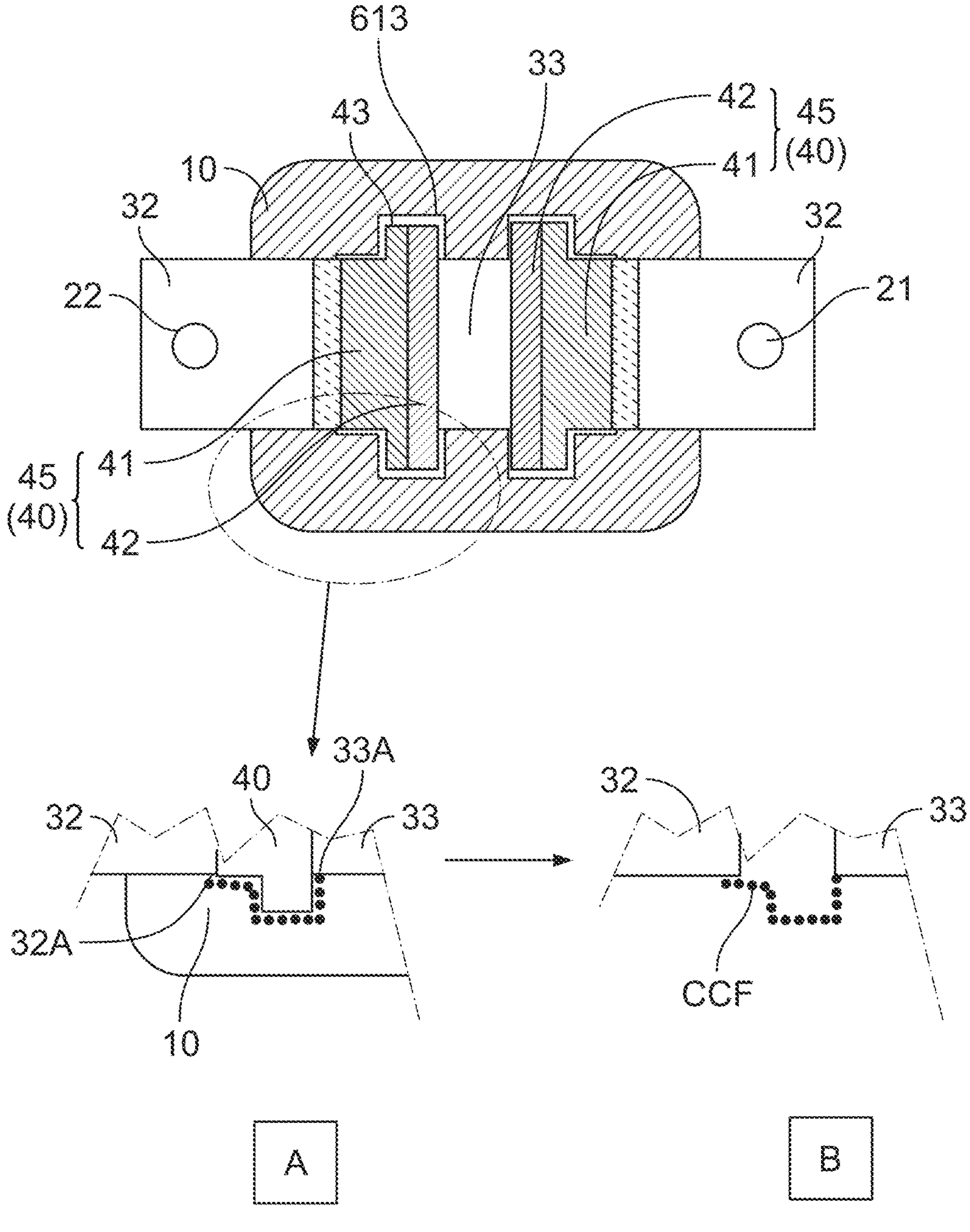
FIG. 5 schematically represents a cross section in top view of the circuit breaker of FIG. 1.

FIG. 5 shows a schematic cross-section (not showing all the details of FIG. 1) of the circuit breaker of FIG. 1 after opening, in a plane passing through the upper face of the electrical conductor 31, seen from above.

The electrical conductor 31 has therefore been opened in three discrete portions of conductor, that is, two discrete lateral portions 32 and a central portion 33. The central portion 33 is separated from the two discrete lateral portions 32 by the lateral projections 45 of the opening member 40.

Detail A and detail B of FIG. 5 show that a leakage current can travel along a leakage current route CCF formed along the inner wall of the internal chamber 60, in particular, between the lower corner 32A of the discrete lateral portion 32 and the lower corner 33A of the central portion 33 which is the shortest leakage current route.

It should be noted that the function of providing good insulation resistance is to be ensured after operation, once the electrical conductor 31 has been broken or opened. Typically, a leakage current cannot be established along the arc path TA because the resistivity of the air is too great. As a consequence, a leakage current can only run along the walls of the circuit breaker, in particular the inner walls of the internal chamber 60 or the walls of the opening member 40, and this preferably on the shortest route, which has the lowest insulation resistance.

As shown in details A and B of FIG. 5, the leakage current route CCF runs or extends along the wall of the internal chamber 60. In practice, it is intended or sought for the insulation resistance between the connection terminals to be greater than 30 Mohms, preferably greater than 50 Mohms, preferably greater than 100 Mohms, preferably greater than 500 Mohms, and very preferentially greater than 1 Gohms, even if particles or condensed gases have deposited on the inner wall of the internal chamber.

In order to guarantee good insulation resistance, it may be proposed, in a first alternative, to provide in the internal chamber 60 a wall formed with a plastic material comprising a flame retardant. Indeed, the applicant has found that the addition of a flame retardant, in particular in a wall forming a surface exposed to the electric arc during the operation of the circuit breaker, makes it possible to significantly increase the insulation resistances after operation.

The plastic material comprising the flame retardant may typically be a polyamide, and preferably a polyphthalamide (such as PA 6T/66). It is possible to provide reinforcing fibers, for example glass fibers in a ratio of 45% to 55% by weight.

The flame retardant is typically a non-halogenated compound selected from the following materials and the mixtures thereof:

- the conversion or reaction products of melamine with cyanuric acid,
- the melamine condensation products,
- the conversion or reaction products of melamine with polyphosphoric acid,
- the conversion or reaction products of the products of the condensation of melamine with polyphosphoric acid,
- metal phosphinates,
- esters of phosphoric acid.

In particular, provision may be made for the flame retardant to be a non-halogenated compound, selected from the following compounds and the mixtures thereof:

- melamine cyanurate, melamine phosphate, melamine pyrophosphate, melamine polyphosphate, melem phosphate, melem pyrophosphate, dimelamine pyrophosphate, dimelamine phosphate, melem polyphosphate, phosphaphenanthrenes, metal hydroxides, phosphinic acid salts, diphosphinic acid salts.

The plastic material comprising the flame retardant may comprise the flame retardant between 2% and 30% by weight, and preferably between 5% and 30% by weight and more preferentially between 8% and 25% by weight.

The flame retardant may further comprise at least one synergist (or synergistic compound, which further improves the ignition resistance), said at least one synergist being selected from the group consisting of compounds containing nitrogen, compounds containing nitrogen and phosphorus, metal borates, metal carbonates, metal hydroxides, metal hydroxyoxides, metal nitrides, metal oxides, metal phosphates, metal sulfides, metal stannates, metal hydroxystannates, silicates, zeolites, basic zinc silicates, silicic acids and combinations thereof, in particular triazine derivatives, melamine, guanidine, guanidine derivatives, biuret, triuret, tartrazine, glycoluril, acetoguanamine, butyroguanamine, caprinoguanamine, benzoguanamine, melamine derivatives of cyanuric acid, melamine derivatives of isocyanuric acid, melamine cyanurate, melamine condensation products, melamine pyrophosphate, pyrophosphates of melamine condensation product, dimelamine phosphate, dimelamine pyrophosphate, melamine polyphosphate, dicyandiamide, ammonium polyphosphate, ammonium hydrogen phosphate, ammonium dihydrogen phosphate, polyphosphates of melamine condensation product, melamine sulfate, allantoin, aluminum hydroxide, synthetic aluminum hydroxide, synthetic aluminum metahydroxide, natural aluminum hydroxide, natural aluminum metahydroxide, aluminum oxide, calcium borate, calcium carbonate, calcium and magnesium carbonate, calcium oxide, calcium sulfide, iron oxide, magnesium borate, magnesium carbonate, magnesium hydroxide, magnesium nitride, magnesium oxide, magnesium sulfide, manganese hydroxide, manganese oxide, titanium nitride, titanium dioxide, zinc borate, zinc metaborate, zinc carbonate, zinc hydroxide, zinc nitride, zinc oxide, zinc phosphate, zinc sulfide, zinc stannate, zinc hydroxystannate, basic zinc silicate, tine oxide hydrate and combinations thereof.

Typically, the plastic material comprising the flame retardant self-extinguishes after 10 seconds, during a flammability test conducted according to standard UL94 (6th edition of 28 Mar. 2013) performed on a vertical test specimen, particle losses being permitted as long as the particles lost are not ignited. In particular, the length of the sample is 5" (127 mm) and its width is 0.5" (12.7 mm). Its thickness should not exceed 0.5" (12.7 mm). It is fixed at ¼ of its upper end in the vertical position. A metal mesh covered with surgical cotton is placed 12" (305 mm) under the sample. The burner is set to form a ¾" (19 mm) blue flame. This flame is directed from below onto the bottom edge of the plastic sample at a distance of ⅜" (9.5 mm). It is applied for 10 seconds, then removed. The combustion time of the sample is measured. Once combustion stops, the flame is reapplied for 10 seconds. As soon as removed, the combustion time and incandescence time are measured again. The complete test is performed on five samples.

The tested material is classified as UL 94 V-0 if:

A) None of the five samples burns for more than 10 seconds after the burner flame has been removed.

B) The total combustion time over the 5 tests does not exceed 25 seconds.

C) None of the tested samples burns, either with a flame, or by incandescence, until the holding jaw.

D) No incandescent drop, which might ignite the cotton placed below, falls from any sample.

E) No sample has an incandescence time exceeding 30 seconds.

In the example depicted, the opening member 40 may be provided with an opening body 41 (forming a base part), on which an exposed face 42 is over-molded, formed with the plastic material comprising the flame retardant. Alternatively, the plastic material comprising the flame retardant could be provided at another wall facing into the internal chamber, such as on the housing 10 or on the over-molded body 15.

The base part, that is, herein the opening body 41, may be a second plastic material, such as a polyamide, preferably a polyphthalamide such as PA 6T/XT forming a matrix, and comprising glass fibers, in a proportion ranging from 40% to 50% by weight.

For example, after operating tests (breaking of a live circuit) carried out under varied conditions, insulation resistances were measured on reference circuit breakers, and circuit breakers with an opening member comprising a flame retardant (to form an exposed face 42 attached to the opening member 40). The results are shown in Tables 1, 2 and 3:

Tests Carried Out Under 450 V/8000 A/15 pH/125° C.

TABLE 1

| | Reference part - Insulation resistance (MOhms) | Part with flame retardant - Insulation resistance (MOhms) |
|---|---|---|
| No. 1 | 15.3 | >10000 |
| No. 2 | 4.6 | >10000 |
| No. 3 | 8.7 | >10000 |

Tests Carried Out Under 475 V/8000 A/20 μH/+125° C.

TABLE 2

| | Reference part - Insulation resistance (MOhms) | Part with flame retardant - Insulation resistance (MOhms) |
|---|---|---|
| No. 1 | 0.49 | 15.40 |
| No. 2 | 0.73 | 16.70 |
| No. 3 | 0.54 | 180 |

Tests Carried Out Under 450 V/8000 A/20 μH/+125° C.

TABLE 3

| | Reference part - Insulation resistance (MOhms) | Part with flame retardant - Insulation resistance (MOhms) |
|---|---|---|
| No. 1 | 1.8 | 64.0 |
| No. 2 | 1.8 | 592.0 |
| No. 3 | 0.9 | 131.0 |
| No. 4 | 2.1 | 82.7 |

It may be noted that in each series of tests, the insulation resistances after opening are significantly higher with the parts of which the internal chamber comprises a surface exposed to the electric arc formed by the material comprising the flame retardant, than on the reference parts not comprising flame retardant.

It should be noted that the plastic material containing the flame retardant is positioned as close as possible to the arc path TA, and to this end, a passage 44 is provided on the opening member 40 to guide the electric arc, the passage 44 being directly formed in the plastic material containing the flame retardant. In practice, the passage 44 is a groove of small dimensions (a few tenths of millimeters wide and/or deep) formed in the plastic material containing the flame retardant, in order to provide a free space even when the opening member 40 is in the final position in abutment against the return 13, so that an electric arc preferentially passes through this passage 44 and will remove the plastic material containing the flame retardant by ablation.

In order to guarantee good insulation resistance, it may be proposed, in a second alternative, to provide in the internal chamber 60 a wall formed with a third plastic material comprising silicone. Indeed, the applicant has found that the addition of silicone, in particular in a wall on which a leakage current could pass after the operation of the circuit breaker, makes it possible to significantly increase the insulation resistances after operation.

In particular, the third plastic material comprising silicone comprises a polyamide-type polymer, preferably a polyphthalamide, such as PA 6T/XT. In detail, the third plastic material comprising silicone comprises silicone and/or polysiloxane, in a proportion ranging from 3.5% to 6.5% by weight, and preferentially from 4.25% to 5.75% by weight.

In the example depicted, provision may be made for the third plastic material comprising the silicone to be used for the over-molding of the electrical conductor 31, that is to say in order to produce the over-molded body visible in FIG. 1. In fact, according to the exemplary embodiment depicted herein, it is on the wall of this component (the over-molded body 15) that the shortest leakage current route is located, as explained hereinbefore referring to FIG. 5. However, it would be possible to add silicone in other parts forming walls contained in the internal chamber 60, like the housing 10 or the breaking member 40.

The applicant has found that the addition of silicone in this over-molding made it possible to increase the insulation resistances. For example, after operating tests (breaking of a live circuit), insulation resistances were measured on reference circuit breakers, and circuit breakers with over-molded body 15 comprising 10% silicone. The results are shown in Table 4:

Tests Carried Out Under 450 V/8000 A/20 μH/+125° C.

TABLE 4

| | Reference part - Insulation resistance (MOhms) | Part with silicone - Insulation resistance (MOhms) |
|---|---|---|
| No. 1 | 1.8 | 154.0 |
| No. 2 | 1.8 | 92.2 |
| No. 3 | 0.9 | 6.2 |
| No. 4 | 2.1 | 13.1 |

It may be noted that the insulation resistances after opening are significantly higher with the parts of which the over-molded body 15 comprises 10% silicone, than on the reference parts of which the over-molded body 15 does not comprise silicone Finally, the applicant has found that there was a strong increase in insulation resistances if the two alternatives are added, that is to say providing in the internal chamber;

a wall with the plastic material comprising the flame retardant, and a wall with the third plastic material comprising the silicone.

Indeed, in the context of the tests reported in Tables 3 and 4, the applicant also tested circuit breakers with a wall of the internal chamber comprising flame retardant (the exposed face 42 of the opening member 40) and another wall comprising silicone (in the over-molded body 15), and the results are given in Table 5.

Tests Carried Out Under 450 V/8000 A/20 μH/+125° C.

TABLE 5

| | Reference part - (MOhms) | Part with flame retardant - (MOhms) | Part with Silicone - (MOhms) | Part with flame retardant and with Silicone - (MOhms) |
|---|---|---|---|---|
| No. 1 | 1.8 | 64.0 | 154.0 | 2160.0 |
| No. 2 | 1.8 | 592.0 | 92.2 | 2020.0 |
| No. 3 | 0.9 | 131.0 | 6.2 | >10000 |
| No. 4 | 2.1 | 82.7 | 13.1 | 9600.0 |

It may be noted from the results of Table 5 that the effect on the insulation resistance by adding a wall of the internal chamber comprising flame retardant and another wall comprising silicone goes well beyond the simple addition of the effects measured on parts comprising only one of the alternatives. As a consequence, synergism has been observed and this configuration (a wall of the internal chamber comprising flame retardant and another wall comprising silicone) has a proven advantage.

It will be understood that various modifications and/or improvements which are obvious for the person skilled in the art may be made to the different embodiments of the invention described in the present description, without departing from the scope of the invention.

The invention claimed is:

1. A pyrotechnic circuit breaker comprising:

a housing;

at least two connection terminals;

an internal electric circuit connecting the two connection terminals and formed by an electrical conductor;

an opening member, movable and arranged to open a part to be opened of the internal electric circuit when moving between an initial position and a final position, so as to form at least two discrete portions of conductor after opening;

a pyrotechnic actuator arranged to move the opening member from the initial position to the final position; and an internal chamber receiving the part to be opened, wherein the housing has at least one internal surface, formed by a wall formed with a plastic material and a flame retardant, which extends into the internal chamber.

2. The pyrotechnic circuit breaker according to claim 1, wherein the plastic material is a polyphthalamide (PA 6T/66).

3. The pyrotechnic circuit breaker according to claim 1, wherein the wall has an internal bar that includes a polymer forming a matrix, and comprising a filler material including fibers selected from a group consisting of glass fibers and carbon fibers, in a proportion ranging from 10% to 70% by weight.

4. The pyrotechnic circuit breaker according to claim 1, wherein the flame retardant is a non-halogenated compound, selected from a group consisting of:

conversion or reaction products of melamine with cyanuric acid, melamine condensation products, conversion or reaction products of melamine with polyphosphoric acid, conversion or reaction products of the products of the condensation of melamine with polyphosphoric acid, metal phosphinates, esters of phosphoric acid, and mixtures of these materials.

5. The pyrotechnic circuit breaker according to claim 1, wherein the flame retardant is a non-halogenated compound, selected from a group consisting of the following compounds and their mixtures:

melamine cyanurate, melamine phosphate, melamine pyrophosphate, melamine polyphosphate, melem phosphate, melem pyrophosphate, dimelamine pyrophosphate, dimelamine phosphate, melem polyphosphate, phosphaphenanthrenes, metal hydroxides, phosphinic acid salts, and diphosphinic acid salts.

6. The pyrotechnic circuit breaker according to claim 1, further comprising a base part formed of a second plastic material, wherein the second plastic material is attached to or over-molded on the base part.

7. The pyrotechnic circuit breaker according to claim 1, arranged to produce an electric arc between the two discrete portions of conductor during movement of the opening member between the initial position and a final position, when the circuit breaker is connected to a live electrical circuit, wherein the wall has an internal bar arranged in order to be removed by ablation by the electric arc.

8. The pyrotechnic circuit breaker according to claim 7, comprising at least a passage arranged to guide the electric arc between the two discrete portions of conductor, wherein the internal bar is arranged to form or delimit at least partially the passage.

9. The pyrotechnic circuit breaker according to claim 1, wherein the internal chamber comprises or contains at least one wall formed with a third plastic material comprising silicone.

10. The pyrotechnic circuit breaker according to claim 9, comprising at least one support, and wherein the third plastic material comprising silicone is over-molded on or attached to the support.

11. The pyrotechnic circuit breaker according to claim 9, wherein the wall formed with the third plastic material comprising silicone supports a leakage current route between the two discrete portions of conductor after opening.

12. The pyrotechnic circuit breaker according to claim 9, wherein the wall formed with the third plastic material comprising silicone covers less than 50% of a total surface area of the internal chamber.

13. The pyrotechnic circuit breaker according to claim 9, wherein the third plastic material includes silicone in a proportion ranging from 3.5% to 6.5% by weight.

14. A motor vehicle comprising at least one circuit breaker according to claim 1.

15. A pyrotechnic circuit breaker comprising:

a housing;

at least two connection terminals;

an internal electric circuit connecting the two connection terminals and formed by an electrical conductor;

an opening member, movable and arranged to open a part to be opened of the internal electric circuit when moving between an initial position and a final position, so as to form at least two discrete portions of conductor after opening;

a pyrotechnic actuator arranged to move the opening member from the initial position to the final position; and an internal chamber receiving the part to be opened, wherein the housing comprises at least one wall protruding from an internal surface of the internal chamber, wherein the wall has an internal bar with a material comprising a plastic material and a flame retardant.

16. The pyrotechnic circuit breaker of claim 1, wherein the plastic material includes a polymer forming a matrix and including a filler material of inorganic glass fibers, the inorganic glass fibers in a proportion ranging from 45% to 55% by weight.

17. The pyrotechnic circuit breaker of claim 1:

wherein the opening member is provided with an opening body on which an exposed face is over-molded, the exposed face formed by a plastic material having a flame retardant, and wherein the exposed face is arranged opposite the part to be opened and/or on a same side as the internal chamber.

18. The pyrotechnic circuit breaker of claim 1, wherein the pyrotechnic circuit breaker includes a base part having a main portion constructed of a second plastic material without a flame retardant and an exposed face over-molded on the main portion, the exposed face including the second plastic material and a flame retardant.

19. A pyrotechnic circuit breaker comprising:

a housing;

at least two connection terminals;

an internal electric circuit connecting the two connection terminals and formed by an electrical conductor;

an opening member, movable and arranged to open a part to be opened of the internal electric circuit when moving between an initial position and a final position, so as to form at least two discrete portions of conductor after opening;

a pyrotechnic actuator arranged to move the opening member from the initial position to the final position; and an internal chamber receiving the part to be opened, wherein the opening member is provided with an opening body on which an exposed face is over-molded, the exposed face formed by a plastic material having a flame retardant, and wherein the exposed face is arranged opposite the part to be opened and/or on a same side as the internal chamber.

* * * * *